US005565137A

United States Patent [19]

Capeci

[11] Patent Number: 5,565,137

[45] Date of Patent: *Oct. 15, 1996

[54] PROCESS FOR MAKING A HIGH DENSITY DETERGENT COMPOSITION FROM STARTING DETERGENT INGREDIENTS

[75] Inventor: Scott W. Capeci, North Bend, Ohio

[73] Assignee: The Proctor & Gamble Co., Cincinnati, Ohio

[ * ] Notice: The term of this patent shall not extend beyond the expiration date of Pat. No. 5,366,652.

[21] Appl. No.: 246,521

[22] Filed: May 20, 1994

[51] Int. Cl.$^6$ .............................. C09K 3/00; C11D 3/12; C11D 11/00; C11D 17/06

[52] U.S. Cl. .......................... 510/216; 252/383; 510/336; 510/351; 510/323

[58] Field of Search ............................ 252/89.1, 90, 174, 252/174.23, 135, 174.13, 174.14, 174.25, 383

[56] References Cited

U.S. PATENT DOCUMENTS

| | | | |
|---|---|---|---|
| 4,487,710 | 12/1984 | Kaminsky | 252/546 |
| 4,846,409 | 7/1989 | Kaspar et al. | 241/21 |
| 4,894,117 | 1/1990 | Bianchi et al. | 159/49 |
| 4,919,847 | 4/1990 | Barletta et al. | 252/558 |
| 4,925,585 | 5/1990 | Strauss et al. | 252/89.1 |
| 5,045,238 | 9/1991 | Jolicoeur et al. | 252/550 |
| 5,066,425 | 11/1991 | Ofosu-Asante et al. | 252/546 |
| 5,108,646 | 4/1992 | Beerse et al. | 252/174.25 |
| 5,133,924 | 7/1992 | Appel et al. | 264/342 R |
| 5,152,932 | 10/1992 | Mueller et al. | 252/550 |
| 5,160,657 | 11/1992 | Bortolotti et al. | 252/174.14 |
| 5,164,108 | 11/1992 | Appel et al. | 252/174 |
| 5,205,958 | 4/1993 | Swatling et al. | 252/174.13 |
| 5,366,652 | 11/1994 | Capeci et al. | 252/89.1 |

FOREIGN PATENT DOCUMENTS

| | | | |
|---|---|---|---|
| 0340013A2 | 11/1989 | European Pat. Off. | C11D 3/12 |
| 0351937A1 | 1/1990 | European Pat. Off. | C11D 11/00 |
| 0367339A2 | 5/1990 | European Pat. Off. | C11D 11/00 |
| 0390251A2 | 10/1990 | European Pat. Off. | C11D 11/00 |
| 0390287A2 | 10/1990 | European Pat. Off. | C11D 17/00 |
| 0425277A2 | 5/1991 | European Pat. Off. | C11D 3/12 |
| 0438320A2 | 7/1991 | European Pat. Off. | C11D 17/06 |
| 0451894A1 | 10/1991 | European Pat. Off. | C11D 10/04 |
| 0460925A2 | 12/1991 | European Pat. Off. | C11D 1/14 |
| 0483413A1 | 5/1992 | European Pat. Off. | C11D 1/28 |
| 0506184A1 | 9/1992 | European Pat. Off. | C11D 11/04 |
| 0510746 | 10/1992 | European Pat. Off. | |
| 0508543A1 | 10/1992 | European Pat. Off. | C11D 17/06 |
| 1517713 | 7/1978 | United Kingdom | C11D 17/06 |
| 2166452 | 5/1986 | United Kingdom | C11D 11/00 |
| WO93/25378 | 12/1993 | WIPO | |

OTHER PUBLICATIONS

Naviglio and Moriconi, "Detergents Manufacture, " *Soap/Cosmetics/Chemical Specialties*, Sept. 1987, pp. 34–37, 54–56.

Copending application Serial No. 08/137,877, entitled Process for Making High Density Detergent Agglomerates from Starting Detergent Ingredients in a Single Mixer/Densifier, filed Oct. 15, 1993, by Scott W. Capeci et al.

Copending application Serial No. 08/113,572, entitled Process for Making High Density Detergent Agglomerates Using an Anhydrous Powder Additive, filed Aug. 27, 1993, by Scott W. Capeci et al which has now been allowed.

*Primary Examiner*—Dennis Albrecht

*Attorney, Agent, or Firm*—Ken K. Patel; Jerry J. Yetter; Jacobus C. Rasser

[57] ABSTRACT

A process for preparing high density detergent agglomerates having a density of at least 650 g/l is provided. The process comprises the steps of: (a) continuously mixing a detergent surfactant paste and dry starting detergent material into a high speed mixer/densifier to obtain detergent agglomerates, wherein the ratio of the surfactant paste to the dry detergent material is from about 1:10 to about 10:1; (b) mixing the detergent agglomerates in a moderate speed mixer/densifier to further densify and agglomerate the detergent agglomerates; and (c) drying said detergent agglomerates so as to form the high density detergent composition. The process may include one or more additional processing steps such as adding a coating agent after the moderate speed mixer/densifier to facilitate and control agglomeration.

8 Claims, 1 Drawing Sheet

PROCESS FOR MAKING A HIGH DENSITY DETERGENT COMPOSITION FROM STARTING DETERGENT INGREDIENTS

FIELD OF THE INVENTION

The present invention generally relates to a process for producing a high density detergent composition. More particularly, the invention is directed to a continuous process during which high density detergent agglomerates are produced by feeding a surfactant paste and dry starting detergent material into two serially positioned mixer/densifiers. The process produces a free flowing, high density detergent composition which can be commercially sold as a low dosage or "compact" detergent composition.

BACKGROUND OF THE INVENTION

Recently, there has been considerable interest within the detergent industry for laundry detergents which are "compact" and therefore, have low dosage volumes. To facilitate production of these so-called low dosage detergents, many attempts have been made to produce high bulk density detergents, for example with a density of 600 g/l or higher. The low dosage detergents are currently in high demand as they conserve resources and can be sold in small packages which are more convenient for consumers.

Generally, there are two primary types of processes by which detergent granules or powders can be prepared. The first type of process involves spray-drying an aqueous detergent slurry in a spray-drying tower to produce highly porous detergent granules. In the second type of process, the various detergent components are dry mixed after which they are agglomerated with a binder such as a nonionic or anionic surfactant. In both processes, the most important factors which govern the density of the resulting detergent granules are the density, porosity and surface area of the various starting materials and their respective chemical composition. These parameters, however, can only be varied within a limited range. Thus, a substantial bulk density increase can only be achieved by additional processing steps which lead to densification of the detergent granules.

There have been many attempts in the art for providing processes which increase the density of detergent granules or powders. Particular attention has been given to densification of spray-dried granules by post tower treatment. For example, one attempt involves a batch process in which spray-dried or granulated detergent powders containing sodium polyphosphate and sodium sulfate are densified and spheronized in a Marumerizer®. This apparatus comprises a substantially horizontal, roughened, rotatable table positioned within and at the base of a substantially vertical, smooth walled cylinder. This process, however, is essentially a batch process and is therefore less suitable for the large scale production of detergent powders. More recently, other attempts have been made to provide a continuous processes for increasing the density of "post-tower" or spray dried detergent granules. Typically, such processes require a first apparatus which pulverizes or grinds the granules and a second apparatus which increases the density of the pulverized granules by agglomeration. These processes achieve the desired increase in density only by treating or densifying "post tower" or spray dried granules.

However, all of the aforementioned processes are directed primarily for densifying or otherwise processing spray dried granules. Currently, the relative amounts and types of materials subjected to spray drying processes in the production of detergent granules has been limited. For example, it has been difficult to attain high levels of surfactant in the resulting detergent composition, a feature which facilitates production of low dosage detergents. Thus, it would be desirable to have a process by which detergent compositions can be produced without having the limitations imposed by conventional spray drying techniques.

To that end, the art is also replete with disclosures of processes which entail agglomerating detergent compositions. For example, attempts have been made agglomerate detergent builders by mixing zeolite and/or layered silicates in a mixer to form free flowing agglomerates. While such attempts suggest that their process can be used to produce detergent agglomerates, they do not provide a mechanism by which a starting detergent materials in the form of pastes, liquids and dry materials can be effectively agglomerated into crisp, free flowing detergent agglomerates having a high density.

Accordingly, there remains a need in the art to have a process for continuously producing a high density detergent composition directly from starting detergent ingredients. Also, there remains a need for such a process which is more efficient and economical to facilitate large-scale production of low dosage or compact detergents.

BACKGROUND ART

The following references are directed to densifying spray-dried granules: Appel et al, U.S. Pat. No. 5,133,924 (Lever); Bortolotti et al, U.S. Pat. No. 5,160,657 (Lever); Johnson et al, British patent No. 1,517,713 (Unilever); and Curtis, European Patent Application 451,894. The following references are directed to producing detergents by agglomeration: Beerse et al, U.S. Pat. No. 5,108,646 (Procter & Gamble); Hollingsworth et al, European Patent Application 351,937 (Unilever); and Swatling et al, U.S. Pat. No. 5,205, 958.

SUMMARY OF THE INVENTION

The present invention meets the aforementioned needs in the art by providing a process which continuously produces a high density detergent composition directly from starting detergent ingredients. Consequently, the process achieves the desired high density detergent composition without unnecessary process parameters, such as the use of spray drying techniques and relatively high operating temperatures, all of which increase manufacturing costs. As used herein, the term "agglomerates" refers to particles formed by agglomerating starting detergent ingredients (particles) which typically have a smaller mean particle size than the formed agglomerates. All percentages and ratios used herein are expressed as percentages by weight (anhydrous basis) unless otherwise indicated. All documents are incorporated herein by reference. All viscosities referenced herein are measured at 70° C. (±5° C.) and at shear rates of about 10 to 100 $sec^{-1}$.

In accordance with one aspect of the invention, a process for preparing a crisp, free flowing, high density detergent composition is provided. The process comprises the steps of: (a) continuously mixing a detergent surfactant paste and dry starting detergent material into a high speed mixer/densifier to obtain detergent agglomerates, wherein the ratio of the surfactant paste to the dry detergent material is from about 1:10 to about 10:1; (b) mixing the detergent agglomerates in a moderate speed mixer/densifier to further densify and agglomerate the detergent agglomerates; and (c) drying the detergent agglomerates so as to form the high density detergent composition.

In one embodiment, the dry starting material comprises a builder selected from the group consisting of aluminosilicates, crystalline layered silicates, sodium carbonate and mixtures thereof. Another embodiment entails processing the agglomerates such that the density of the detergent composition is at least 650 g/l. In a preferred embodiment, the process further comprises the step of adding a coating agent after the moderate speed mixer/densifier (e.g. between the moderate speed mixer/densifier and drying apparatus, in the moderate speed mixer/densifier or between the moderate speed mixer/densifier and drying apparatus), wherein the coating agent is selected from the group consisting of aluminosilicates, carbonates, silicates and mixtures thereof.

Other embodiments include further cooling the detergent agglomerates; maintaining the mean residence time of the detergent agglomerates in the high speed mixer/densifier in range from about 2 seconds to about 45 seconds; and/or maintaining the mean residence time of the detergent agglomerates in the moderate speed mixer/densifier in range from about 0.5 minutes to about 15 minutes. Optionally, the process may comprise the step of continuously spraying another binder material into the high speed mixer/densifier. The binder is selected from the group consisting of water, anionic surfactants, nonionic surfactants, polyethylene glycol, polyvinyl pyrrolidone, polyacrylates, citric acid and mixtures thereof.

In other aspects of the invention, the ratio of the surfactant paste to the dry detergent material is from about 1:4 to about 4:1; the surfactant paste has a viscosity of from about 5,000 cps to about 100,000 cps; and the surfactant paste comprises water and a surfactant selected from the group consisting of anionic, nonionic, zwitterionic, ampholytic and cationic surfactants and mixtures thereof. An optional embodiment of the process contemplates having the high speed and moderate speed mixer/densifier together imparting from about $5\times10^{10}$ erg/kg to about $2\times10^{12}$ erg/kg of energy at a rate of from about $3\times10^{8}$ erg/kg-sec to about $3\times10^{9}$ erg/kg-sec.

Other embodiments of the invention are directed to a step of adding a coating agent to the moderate speed mixer/densifier, and/or a step of adding a coating agent between the mixing step and the drying step.

In an especially preferred embodiment of the invention, the process comprises the steps of: (a) continuously mixing a detergent surfactant paste and dry starting detergent material comprising a builder selected from the group consisting of aluminosilicates, crystalline layered silicates, sodium carbonate and mixtures thereof into a high speed mixer/densifier to obtain detergent agglomerates, wherein the ratio of the surfactant paste to the dry detergent material is from about 1:10 to about 10:1; (b) mixing the detergent agglomerates in a moderate speed mixer/densifier to further densify and agglomerate the detergent agglomerates; (c) drying the detergent agglomerates; and (d) adding a coating agent to obtain the high density detergent composition which has a density of at least 650 g/l; wherein the coating agent is selected from the group consisting of aluminosilicates, carbonates, silicates and mixtures thereof. The invention also provides a high density detergent composition made according to the process of the invention and its various embodiments.

Accordingly, it is an object of the present invention to provide a process for continuously producing a high density detergent composition directly from starting detergent ingredients. It is also an object of the invention to provide such a process which is not limited by unnecessary process parameters, such as the use of spray drying techniques or granules produced therefrom, and operating temperatures, so that large-scale production of low dosage or compact detergents is more economical and efficient. These and other objects, features and attendant advantages of the present invention will become apparent to those skilled in the art from a reading of the following drawing, detailed description of the preferred embodiment and the appended claims.

DETAILED DESCRIPTION OF THE PREFERRED EMBODIMENT

Figure 1:
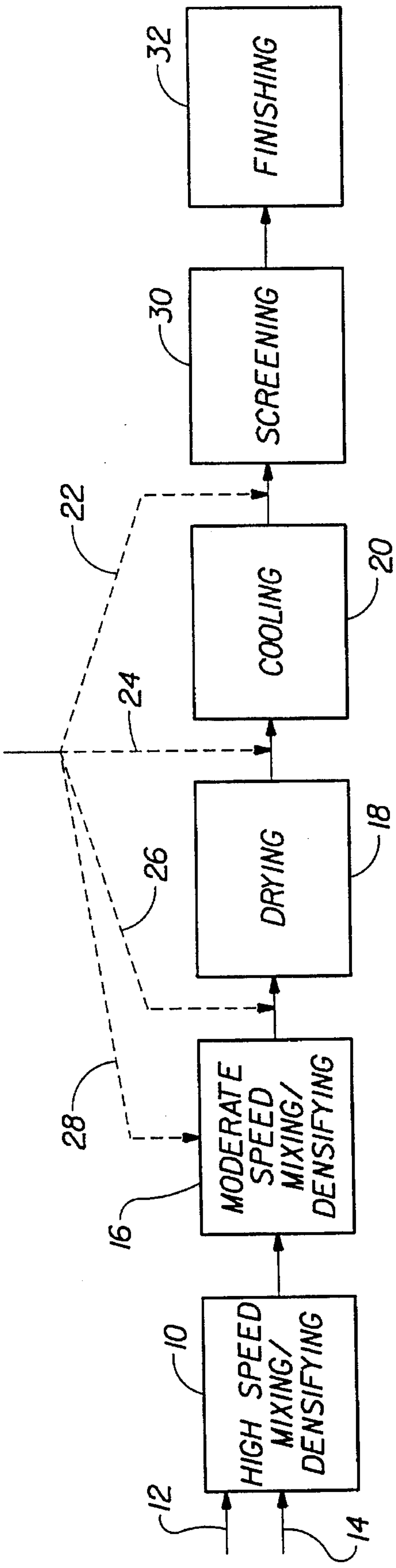
FIG. 1 is a flow chart illustrating a preferred process in which two agglomerating mixer/densifiers, fluid bed dryer, fluid bed cooler and screening apparatus are serially positioned in accordance with the invention.

The present process is used in the production of low dosage detergent agglomerates directly from starting detergent ingredients rather than conventional "post-tower" detergent granules. By "post-tower" detergent granules, we mean those detergent granules which have been processed through a conventional spray-drying tower or similar apparatus. The process of the invention allows for production of low dosage detergents in an environmentally conscious manner in that the use of spray drying techniques and the like which typically emit pollutants though their towers or stacks into the atmosphere is eliminated. This feature of the process invention is extremely desirable in geographic areas which are especially sensitive to emission of pollutants into the atmosphere.

PROCESS

Reference is now made to FIG. 1 which presents a flow chart illustrating the instant process and various embodiments thereof. In the first step of the process, the invention entails continuously mixing into a high speed mixer/densifier 10 several streams of starting detergent ingredients including a surfactant paste stream 12 and a dry starting detergent material stream 14. The surfactant paste 12 preferably comprises from about 25% to about 65%, preferably from about 35% to about 55% and, most preferably from about 38% to about 44%, of a detergent surfactant in an aqueous paste form. Preferably, the dry starting detergent material 14 comprises from about 20% to about 50%, preferably from about 25% to about 45% and, most preferably from about 30% to about 40% of an aluminosilicate or zeolite builder, and from about 10% to about 40%, preferably from about 15% to about 30% and, most preferably from about 15% to about 25% of a sodium carbonate. It should be understood that additional starting detergent ingredients several of which are described hereinafter may be mixed into high speed mixer/densifier 10 without departing from the scope of the invention.

However, it has surprisingly been found that the surfactant paste 12 and the dry starting detergent material 14 are continuously mixed within the ratio ranges described herein so as to insure production of the desired free flowing, crisp, high density detergent composition. Preferably, the ratio of the surfactant paste 12 to the dry starting detergent material 14 is from about 1:10 to about 10:1, more preferably from about 1:4 to about 4:1 and, most preferably from about 2:1 to about 2:3.

It has been found that the first processing step can be successfully completed, under the process parameters described herein, in a high speed mixer/densifier 10 which preferably is a Lodige CB mixer or similar brand fixer. These types of mixers essentially consist of a horizontal, hollow static cylinder having a centrally mounted rotating shaft around which several plough-shaped blades are attached. Preferably, the shaft rotates at a speed of from about 100 rpm to about 2500 rpm, more preferably from about 300 rpm to about 1600 rpm. Preferably, the mean residence time of the detergent ingredients in the high speed mixer/densifier 10 is preferably in range from about 2 seconds to about 45 seconds, and most preferably from about 5 seconds to about 15 seconds.

The resulting detergent agglomerates formed in the high speed mixer/densifier 10 are then fed into a lower or moderate speed mixer/densifier 16 during which further agglomeration and densification is carried forth. This particular moderate speed mixer/densifier 16 used in the present process should include liquid distribution and agglomeration tools so that both techniques can be carried forth simultaneously. It is preferable to have the moderate speed mixer/densifier 16 to be, for example, a Lodige KM (Ploughshare) mixer, Drais® K-T 160 mixer or similar brand mixer. The residence time in the moderate speed mixer/densifier 16 is preferably from about 0.5 minutes to about 15 minutes, most preferably the residence time is about 1 to about 10 minutes. The liquid distribution is accomplished by cutters, generally smaller in size than the rotating shaft, which preferably operate at about 3600 rpm.

In accordance with the present process, the high speed mixer/densifier 10 and moderate speed mixer/densifier 16 in combination preferably impart a requisite amount of energy to form the desired agglomerates. More particularly, the moderate speed and high speed mixer/densifiers impart from about $5\times10^{10}$ erg/kg to about $2\times10^{12}$ erg/kg at a rate of from about $3\times10^{8}$ erg/kg-sec to about $3\times10^{9}$ erg/kg-sec to form free flowing high density detergent agglomerates. The energy input and rate of input can be determined by calculations from power readings to the moderate speed and high speed mixer/densifier with and without granules, residence time of the granules in the mixer/densifier, and the mass of the granules in the mixer/densifier. Such calculations are clearly within the scope of the skilled artisan.

The density of the resulting detergent agglomerates exiting the moderate speed mixer/densifier 16 is at least 650 g/l, more preferably from about 700 g/l to about 800 g/l. Thereafter, the detergent agglomerates are dried in a fluid bed dryer 18 or similar apparatus to obtain the high density granular detergent composition which is ready for packaging and sale as a low dosage, compact detergent product at this point. The particle porosity of the resulting detergent agglomerates of the composition is preferably in a range from about 5% to about 20%, more preferably at about 10%. As those skilled in the art will readily appreciate, a low porosity detergent agglomerate provides a dense or low dosage detergent product, to which the present process is primarily directed. In addition, an attribute of dense or densified detergent agglomerates is the relative particle size. The present process typically provides agglomerates having a mean particle size of from about 400 microns to about 700 microns, and more preferably from about 450 microns to about 500 microns. As used herein, the phrase "mean particle size" refers to individual agglomerates and not individual particles or detergent granules. The combination of the above-referenced porosity and particle size results in agglomerates having density values of 650 g/l and higher. Such a feature is especially useful in the production of low dosage laundry detergents as well as other granular compositions such as dishwashing compositions.

OPTIONAL PROCESS STEPS

In an optional step of the present process, the detergent agglomerates exiting the fluid bed dryer 18 are further conditioned by cooling the agglomerates in a fluid bed cooler 20 or similar apparatus as are well known in the art. Another optional process step involves adding a coating agent to improve flowability and/or minimize over agglomeration of the detergent composition in one or more of the following locations of the instant process: (1) the coating agent can be added directly after the fluid bed cooler 20 as shown by coating agent stream 22 (preferred); (2) the coating agent may be added between the fluid bed dryer 18 and the fluid bed cooler 20 as shown by coating agent stream 24; (3) the coating agent may be added between the fluid bed dryer 18 and the moderate speed mixer/densifier 16 as shown by stream 26; and/or (4) the coating agent may be added directly to the moderate speed mixer/densifier 16 and the fluid bed dryer 18 as shown by stream 28. It should be understood that the coating agent can be added in any one or a combination of streams 22, 24, 26, and 28 as shown in FIG. 1. The coating agent stream 22 is the most preferred in the instant process. The coating agent is preferably selected from the group consisting of aluminosilicates, silicates, carbonates and mixtures thereof. The coating agent not only enhances the free flowability of the resulting detergent composition which is desirable by consumers in that it permits easy scooping of detergent during use, but also serves to control agglomeration by preventing or minimizing over agglomeration, especially when added directly to the moderate speed mixer/densifier 16. As those skilled in the art are well aware, over agglomeration can lead to very undesirable flow properties and aesthetics of the final detergent product.

Optionally, the process can comprises the step of spraying an additional binder in one or both of the mixer/densifiers 10 and 16. A binder is added for purposes of enhancing agglomeration by providing a "binding" or "sticking" agent for the detergent components. The binder is preferably selected from the group consisting of water, anionic surfactants, nonionic surfactants, polyethylene glycol, polyvinyl pyrrolidone polyacrylates, citric acid and mixtures thereof. Other suitable binder materials including those listed herein are described in Beerse et al, U.S. Pat. No. 5,108,646 (Procter & Gamble Co.), the disclosure of which is incorporated herein by reference.

Other optional steps contemplated by the present process include screening the oversized detergent agglomerates in a screening apparatus 30 which can take a variety of forms including but not limited to conventional screens chosen for the desired particle size of the finished detergent product. Other optional steps include conditioning of the detergent agglomerates by subjecting the agglomerates to additional drying.

Another optional step of the instant process entails finishing the resulting detergent agglomerates by a variety of processes including spraying and/or admixing other conventional detergent ingredients, collectively referenced as the finishing step 32 in FIG. 1. For example, the finishing step encompasses spraying perfumes, brighteners and enzymes onto the finished agglomerates to provide a more complete detergent composition. Such techniques and ingredients are well known in the art.

DETERGENT SURFACTANT PASTE

The detergent surfactant paste used in the process is preferably in the form of an aqueous viscous paste, although forms are also contemplated by the invention. This so-called viscous surfactant paste has a viscosity of from about 5,000 cps to about 100,000 cps, more preferably from about 10,000 cps to about 80,000 cps, and contains at least about 10% water, more preferably at least about 20% water. The viscosity is measured at 70° C. and at shear rates of about 10 to 100 $sec.^{-1}$. Furthermore, the surfactant paste, if used, preferably comprises a detersive surfactant in the amounts specified previously and the balance water and other conventional detergent ingredients.

The surfactant itself, in the viscous surfactant paste, is preferably selected from anionic, nonionic, zwitterionic, ampholytic and cationic classes and compatible mixtures thereof. Detergent surfactants useful herein are described in U.S. Pat. No. 3,664,961, Norris, issued May 23, 1972, and in U.S. Pat. No. 3,919,678, Laughlin et al., issued Dec. 30, 1975, both of which are incorporated herein by reference. Useful cationic surfactants also include those described in U.S. Pat. No. 4,222,905, Cocktell, issued Sep. 16, 1980, and in U.S. Pat. No. 4,239,659, Murphy, issued Dec. 16, 1980, both of which are also incorporated herein by reference. Of the surfactants, anionics and nonionics are preferred and anionics are most preferred.

Nonlimiting examples of the preferred anionic surfactants useful in the surfactant paste include the conventional $C_{11}$–$C_{18}$ alkyl benzene sulfonates ("LAS"), primary, branched-chain and random $C_{10}$–$C_{20}$ alkyl sulfates ("AS"), the $C_{10}$–$C_{18}$ secondary (2,3) alkyl sulfates of the formula $CH_3(CH_2)_x(CHOSO_3^-M^+)\ CH_3$ and $CH_3(CH_2)_y\ (CHOSO_3^-M^+)\ CH_2CH_3$ where x and (y+1) are integers of at least about 7, preferably at least about 9, and M is a water-solubilizing cation, especially sodium, unsaturated sulfates such as oleyl sulfate, and the $C_{10}$–$C_{18}$ alkyl alkoxy sulfates ("$AE_xS$"; especially EO 1–7 ethoxy sulfates).

Optionally, other exemplary surfactants useful in the paste of the invention include and $C_{10}$–$C_{18}$ alkyl alkoxy carboxylates (especially the EO 1–5 ethoxycarboxylates), the $C_{10-18}$ glycerol ethers, the $C_{10}$–$C_{18}$ alkyl polyglycosides and their corresponding sulfated polyglycosides, and $C_{12}$–$C_{18}$ alpha-sulfonated fatty acid esters. If desired, the conventional nonionic and amphoteric surfactants such as the $C_{12}$–$C_{18}$ alkyl ethoxylates ("AE") including the so-called narrow peaked alkyl ethoxylates and $C_6$–$C_{12}$ alkyl phenol alkoxylates (especially ethoxylates and mixed ethoxy/propoxy), $C_{12}$–$C_{18}$ betaines and sulfobetaines ("sultaines"), $C_{10}$–$C_{18}$ amine oxides, and the like, can also be included in the overall compositions. The $C_{10}$–$C_{18}$ N-alkyl polyhydroxy fatty acid amides can also be used. Typical examples include the $C_{12}$–$C_{18}$ N-methylglucamides. See WO 9,206,154. Other sugar-derived surfactants include the N-alkoxy polyhydroxy fatty acid amides, such as $C_{10}$–$C_{18}$ N-(3-methoxypropyl) glucamide. The N-propyl through N-hexyl $C_{12}$–$C_{18}$ glucamides can be used for low sudsing. $C_{10}$–$C_{20}$ conventional soaps may also be used. If high sudsing is desired, the branched-chain $C_{10}$–$C_{16}$ soaps may be used. Mixtures of anionic and nonionic surfactants are especially useful. Other conventional useful surfactants are listed in standard texts.

DRY DETERGENT MATERIAL

The starting dry detergent material of the present process preferably comprises a detergent aluminosilicate builder which are referenced as aluminosilicate ion exchange materials and sodium carbonate. The aluminosilicate ion exchange materials used herein as a detergent builder preferably have both a high calcium ion exchange capacity and a high exchange rate. Without intending to be limited by theory, it is believed that such high calcium ion exchange rate and capacity are a function of several interrelated factors which derive from the method by which the aluminosilicate ion exchange material is produced. In that regard, the aluminosilicate ion exchange materials used herein are preferably produced in accordance with Corkill et al, U.S. Pat. No. 4,605,509 (Procter & Gamble), the disclosure of which is incorporated herein by reference.

Preferably, the aluminosilicate ion exchange material is in "sodium" form since the potassium and hydrogen forms of the instant aluminosilicate do not exhibit the as high of an exchange rate and capacity as provided by the sodium form. Additionally, the aluminosilicate ion exchange material preferably is in over dried form so as to facilitate production of crisp detergent agglomerates as described herein. The aluminosilicate ion exchange materials used herein preferably have particle size diameters which optimize their effectiveness as detergent builders. The term "particle size diameter" as used herein represents the average particle size diameter of a given aluminosilicate ion exchange material as determined by conventional analytical techniques, such as microscopic determination and scanning electron microscope (SEM). The preferred article size diameter of the aluminosilicate is from about 0.1 micron to about 10 microns, more preferably from about 0.5 microns to about 9 microns. Most preferably, the particle size diameter is from about 1 microns to about 8 microns.

Preferably, the aluminosilicate ion exchange material has the formula $$Na_z[(AlO_2)_z\cdot(SiO_2)_y]xH_2O$$

wherein z and y are integers of at least 6, the molar ratio of z to y is from about 1 to about 5 and x is from about 10 to about 264. More preferably, the aluminosilicate has the formula $$Na_{12}[(AlO_2)_{12}\cdot(SiO_2)_{12}]xH_2O$$

wherein x is from about 20 to about 30, preferably about 27. These preferred aluminosilicates are available commercially, for example under designations Zeolite A, Zeolite B and Zeolite X. Alternatively, naturally-occurring or synthetically derived aluminosilicate ion exchange materials suitable for use herein can be made as described in Krummel et al, U.S. Pat. No. 3,985,669, the disclosure of which is incorporated herein by reference.

The aluminosilicates used herein are further characterized by their ion exchange capacity which is at least about 200 mg equivalent of $CaCO_3$ hardness/gram, calculated on an anhydrous basis, and which is preferably in a range from about 300 to 352 mg equivalent of $CaCO_3$ hardness/gram. Additionally, the instant aluminosilicate ion exchange materials are still further characterized by their calcium ion exchange rate which is at least about 2 grains $Ca^{++}$/gallon/minute/-gram/gallon, and more preferably in a range from about 2 grains $Ca^{++}$/gallon/minute/-gram/gallon to about 6 grains $Ca^{++}$/gallon/minute/-gram/gallon.

ADJUNCT DETERGENT INGREDIENTS

The starting dry detergent material in the present process can include additional detergent ingredients and/or, any number of additional ingredients can be incorporated in the detergent composition during subsequent steps of the present process. These adjunct ingredients include other detergency builders, bleaches, bleach activators, suds boosters or suds suppressors, anti-tarnish and anticorrosion agents, soil suspending agents, soil release agents, germicides, pH adjusting agents, non-builder alkalinity sources, chelating agents, smectite clays, enzymes, enzyme-stabilizing agents and perfumes. See U.S. Pat. No. 3,936,537, issued Feb. 3, 1976 to Baskerville, Jr. et al., incorporated herein by reference.

Other builders can be generally selected from the various water-soluble, alkali metal, ammonium or substituted ammonium phosphates, polyphosphates, phosphonates, polyphosphonates, carbonates, borates, polyhydroxy sulfonates, polyacetates, carboxylates, and polycarboxylates. Preferred are the alkali metal, especially sodium, salts of the above. Preferred for use herein are the phosphates, carbonates, $C_{10-18}$ fatty acids, polycarboxylates, and mixtures thereof. More preferred are sodium tripolyphosphate, tetrasodium pyrophosphate, citrate, tartrate mono- and di-succinates, and mixtures thereof (see below).

In comparison with amorphous sodium silicates, crystalline layered sodium silicates exhibit a clearly increased calcium and magnesium ion exchange capacity. In addition, the layered sodium silicates prefer magnesium ions over calcium ions, a feature necessary to insure that substantially all of the "hardness" is removed from the wash water. These crystalline layered sodium silicates, however, are generally more expensive than amorphous silicates as well as other builders. Accordingly, in order to provide an economically feasible laundry detergent, the proportion of crystalline layered sodium silicates used must be determined judiciously.

The crystalline layered sodium silicates suitable for use herein preferably have the formula $$NaMSi_xO_{2x+1} \cdot yH_2O$$

wherein M is sodium or hydrogen, x is from about 1.9 to about 4 and y is from about 0 to about 20. More preferably, the crystalline layered sodium silicate has the formula $$NaMSi_2O_5 \cdot yH_2O$$

wherein M is sodium or hydrogen, and y is from about 0 to about 20. These and other crystalline layered sodium silicates are discussed in Corkill et al, U.S. Pat. No. 4,605,509, previously incorporated herein by reference.

Specific examples of inorganic phosphate builders are sodium and potassium tripolyphosphate, pyrophosphate, polymeric metaphosphate having a degree of polymerization of from about 6 to 21, and orthophosphates. Examples of polyphosphonate builders are the sodium and potassium salts of ethylene diphosphonic acid, the sodium and potassium salts of ethane 1-hydroxy-1, 1-diphosphonic acid and the sodium and potassium salts of ethane, 1,1,2-triphosphonic acid. Other phosphorus builder compounds are disclosed in U.S. Pat. Nos. 3,159,581; 3,213,030; 3,422,021; 3,422,137; 3,400,176 and 3,400,148, all of which are incorporated herein by reference.

Examples of nonphosphorus, inorganic builders are tetraborate decahydrate and silicates having a weight ratio of $SiO_2$ to alkali metal oxide of from about 0.5 to about 4.0, preferably from about 1.0 to about 2.4. Water-soluble, nonphosphorus organic builders useful herein include the various alkali metal, ammonium and substituted ammonium polyacetates, carboxylates, polycarboxylates and polyhydroxy sulfonates. Examples of polyacetate and polycarboxylate builders are the sodium, potassium, lithium, ammonium and substituted ammonium salts of ethylene diamine tetraacetic acid, nitrilotriacetic acid, oxydisuccinic acid, mellitic acid, benzene polycarboxylic acids, and citric acid.

Polymeric polycarboxylate builders are set forth in U.S. Pat. No. 3,308,067, Diehl, issued Mar. 7, 1967, the disclosure of which is incorporated herein by reference. Such materials include the water-soluble salts of homo- and copolymers of aliphatic carboxylic acids such as maleic acid, itaconic acid, mesaconic acid, fumaric acid, aconitic acid, citraconic acid and methylene malonic acid. Some of these materials are useful as the water-soluble anionic polymer as hereinafter described, but only if in intimate admixture with the non-soap anionic surfactant.

Other suitable polycarboxylates for use herein are the polyacetal carboxylates described in U.S. Pat. No. 4,144,226, issued Mar. 13, 1979 to Crutchfield et al, and U.S. Pat. No. 4,246,495, issued Mar. 27, 1979 to Crutchfield et al, both of which are incorporated herein by reference. These polyacetal carboxylates can be prepared by bringing together under polymerization conditions an ester of glyoxylic acid and a polymerization initiator. The resulting polyacetal carboxylate ester is then attached to chemically stable end groups to stabilize the polyacetal carboxylate against rapid depolymerization in alkaline solution, converted to the corresponding salt, and added to a detergent composition. Particularly preferred polycarboxylate builders are the ether carboxylate builder compositions comprising a combination of tartrate monosuccinate and tartrate disuccinate described in U.S. Pat. No. 4,663,071, Bush et al., issued May 5, 1987, the disclosure of which is incorporated herein by reference.

Bleaching agents and activators are described in U.S. Pat. No. 4,412,934, Chung et al., issued Nov. 1, 1983, and in U.S. Pat. No. 4,483,781, Hamnan, issued Nov. 20, 1984, both of which are incorporated herein by reference. Chelating agents are also described in U.S. Pat. No. 4,663,071, Bush et al., from Column 17, line 54 through Column 18, line 68, incorporated herein by reference. Suds modifiers are also optional ingredients and are described in U.S. Pat. No. 3,933,672, issued Jan. 20, 1976 to Bartoletta et al., and U.S. Pat. No. 4,136,045, issued Jan. 23, 1979 to Gault et al., both incorporated herein by reference.

Suitable smectite clays for use herein are described in U.S. Pat. No. 4,762,645, Tucker et al, issued Aug. 9, 1988, Column 6, line 3 through Column 7, line 24, incorporated herein by reference. Suitable additional detergency builders for use herein are enumerated in the Baskerville patent, Column 13, line 54 through Column 16, line 16, and in U.S. Pat. No. 4,663,071, Bush et al, issued May 5, 1987, both incorporated herein by reference.

In order to make the present invention more readily understood, reference is made to the following examples, which are intended to be illustrative only and not intended to be limiting in scope.

EXAMPLE 1

This Example illustrates the process of the invention which produces free flowing, crisp, high density detergent composition. Two feed streams of various detergent starting ingredients are continuously fed, at a rate of 2800 kg/hr, into a Lodige CB-30 mixer/densifier, one of which comprises a surfactant paste containing surfactant and water and the other stream containing starting dry detergent material containing alumninosilicate and sodium carbonate. The rotational speed of the shall in the Lodige CB-30 mixer/densifier is about 1400 rpm and the mean residence time is about 10 seconds. The contents from the Lodige CB-30 mixer/densifer are continuously fed into a Lodige KM 600 mixer/densifer for further agglomeration during which the mean residence time is about 6 minutes. The resulting detergent agglomerates are then fed to a fluid bed dryer and then to a fluid bed cooler, the mean residence time being about 10 minutes and 15 minutes, respectively. A coating agent, aluminosilicate, is fed about midway down the moderate speed mixer/densifier 16 to control and prevent over agglomeration. The detergent agglomerates are then screened with conventional screening apparatus resulting in a uniform particle size distribution. The composition of the detergent agglomerates exiting the fluid bed cooler is set forth in Table I below:

TABLE I

| Component | % Weight of Total Feed |
|---|---|
| $C_{14-15}$ alkyl sulfate/alkyl ethoxy sulfate | 29.1 |
| Aluminosilicate | 34.4 |
| Sodium carbonate | 17.5 |
| Polyethylene glycol (MW 4000) | 1.3 |
| Misc. (water, etc.) | 16.7 |
| | 100.0 |

Additional detergent ingredients including perfumes, enzymes, and other minors are sprayed onto the agglomerates described above in the finishing step to result in a finished detergent composition. The relative proportions of the overall finished detergent composition produced by the process of instant process is presented in Table. II below:

TABLE II

| Component | (% weight) A |
|---|---|
| $C_{14-15}$ alkyl sulfate/$C_{14-15}$ alkyl ethoxy sulfate | 16.3 |
| Neodol 23-6.5[1] | 3.0 |
| $C_{12-14}$ N-methyl glucamide | 0.9 |
| Polyacrylate (MW = 4500) | 3.0 |
| Polyethylene glycol (MW = 4000) | 1.2 |
| Sodium Sulfate | 8.9 |
| Aluminosilicate | 26.3 |
| Sodium carbonate | 27.2 |
| Protease enzyme | 0.4 |
| Amylase enzyme | 0.1 |
| Lipase enzyme | 0.2 |
| Cellulase enzyme | 0.1 |
| Minors (water, perfume, etc.) | 12.4 |
| | 100.0 |

[1]$C_{12-13}$ alkyl ethoxylate (EO = 6.5) commercially available from Shell Oil Company.

The density of the resulting detergent composition is 796 g/l, the mean particle size is 613 microns.

EXAMPLE II

This Example illustrates another process in accordance with the invention in which the steps described in Example I are performed except the coating agent, aluminosilicate, is added after the fluid bed cooler as opposed to in the moderate speed mixer/densifier. The composition of the detergent agglomerates exiting the fluid bed cooler after the coating agent is added is set forth in Table III below:

TABLE III

| Component | % Weight of Total Feed |
|---|---|
| $C_{14-15}$ alkyl sulfate/alkyl ethoxy sulfate | 21.3 |
| $C_{12-13}$ linear alkylbenzene sulfonate | 7.1 |
| Aluminosilicate | 34.2 |
| Sodium carbonate | 18.3 |
| Polyethylene glycol (MW 4000) | 1.4 |
| Misc. (water, perfume, etc.) | 17.7 |
| | 100.0 |

Additional detergent ingredients including perfumes, brighteners and enzymes are sprayed onto the agglomerates described above in the finishing step to result in a finished detergent composition. The relative proportions of the overall finished detergent composition produced by the process of instant process is presented in Table IV below:

TABLE IV

| Component | (% weight) A |
|---|---|
| $C_{12-16}$ linear alkylbenzene sulfonate | 9.0 |
| $C_{14-15}$ alkyl sulfate/$C_{14-15}$ alkyl ethoxy sulfate | 7.3 |
| Neodol 23-6.5[1] | 3.0 |
| $C_{12-14}$ N-methyl glucamide | 0.9 |
| Polyacrylate (MW = 4500) | 3.0 |
| Polyethylene glycol (MW = 4000) | 1.2 |
| Sodium Sulfate | 8.9 |
| Aluminosilicate | 26.3 |
| Sodium carbonate | 27.2 |
| Protease enzyme | 0.4 |
| Amylase enzyme | 0.1 |
| Lipase enzyme | 0.2 |
| Cellulose enzyme | 0.1 |
| Minors (water, perfume, etc.) | 12.4 |
| | 100.0 |

[1]$C_{12-13}$ alkyl ethoxylate (EO = 6.5) commercially available from Shell Oil Company.

The density of the resulting detergent composition is 800 g/l, the mean particle size is 620 microns.

Having thus described the invention in detail, it will be obvious to those skilled in the art that various changes may be made without departing from the scope of the invention and the invention is not to be considered limited to what is described in the specification.

What is claimed is:

1. A process for continuously preparing high density detergent composition comprising the steps of:

(a) continuously mixing a detergent surfactant paste and dry starting detergent material into a high speed mixer/densifier having a shaft speed of from about 300 rpm to about 2500 rpm to obtain detergent agglomerates, wherein the ratio of said surfactant paste to said dry detergent material is from about 1:10 to about 10:1, and wherein the mean residence time of said detergent agglomerates in said high speed mixer/densifier is in range from about 2 seconds to about 45 seconds;

(b) mixing said detergent agglomerates in a moderate speed mixer/densifier to further densify and agglomerate said detergent agglomerates, wherein the means residence time of said detergent agglomerates in said moderate speed mixer/densifer is in range from about 0.5 minutes to about 15 minutes;

(c) adding a coating agent in an amount sufficient to improve the flowabilty of said detergent agglomerates after said moderate speed mixer/densifier, wherein said coating agent is selected from the group consisting of aluminosilicates, carbonates, silicates and mixtures thereof; and (d) drying said detergent agglomerates so as to form said high density detergent composition.

2. A process according to claim 1 wherein said dry starting material comprises a builder selected from the group consisting of aluminosilicates, crystalline layered silicates, sodium carbonate and mixtures thereof.

3. A process according to claim 1 wherein the density of said detergent composition is at least 650 g/l.

4. A process according to claim 1 further comprising the step of cooling said detergent agglomerates.

5. A process according to claim I wherein said ratio of said surfactant paste to said dry detergent material is from about 1:4 to about 4:1.

6. A process according to claim 1 wherein said surfactant paste has a viscosity of from about 5,000 cps to about 100,000 cps.

7. A process according to claim 1 wherein said surfactant paste comprises water and a surfactant selected from the group consisting of anionic, nonionic, zwitterionic, ampholytic and cationic surfactants and mixtures thereof.

8. A process for continuously preparing high density detergent composition comprising the steps of:

(a) continuously mixing a detergent surfactant paste and a dry starting detergent material comprising a builder selected from the group consisting of aluminosilicates, crystalline layered silicates, sodium carbonate and mixtures thereof, into a high speed mixer/densifier having a shaft speed of from about 300 rpm to about 2500 rpm to obtain detergent agglomerates, wherein the ratio of said surfactant paste to said dry detergent material is from about 1:10 to about 10:1, and wherein the mean residence time of said detergent agglomerates in said high speed mixer/densifier is in range from about 2 seconds to about 45 seconds;

(b) mixing said detergent agglomerates in a moderate speed mixer/densifier to further densify and agglomerate said detergent agglomerates, wherein the mean residence time of said detergent agglomerates in said moderate speed mixer/densifier is in range from about 0.5 minutes to about 15 minutes;

(c) drying said detergent agglomerates; and (d) adding a coating agent in an amount sufficient to improve the flowability of said detergent agglomerates to obtain said high density detergent composition having a density of at least 650 g/l; wherein said coating agent is selected from the group consisting of aluminosilicates, carbonates, silicates and mixtures thereof.

* * * * *